No. 692,334. Patented Feb. 4, 1902.
M. OWENS.
DUST PROOF JOURNAL BOX.
(Application filed July 9, 1901.)
(No Model.)
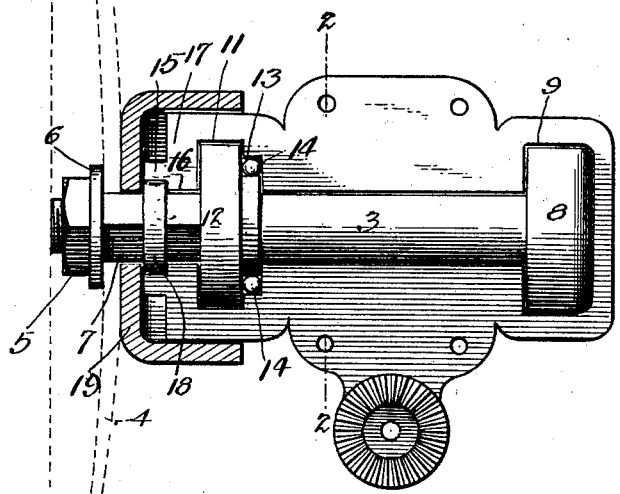
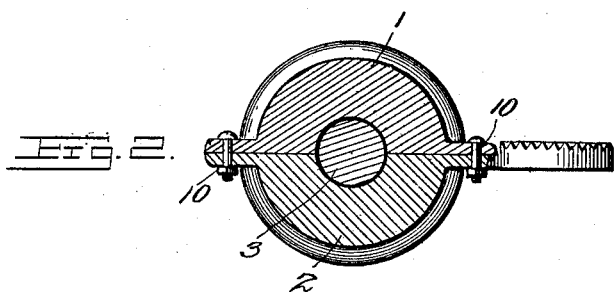
Witnesses
F. C. Alden
H. J. Riley
M. Owens, Inventor
by C. A. Snow & Co.
Attorneys

UNITED STATES PATENT OFFICE.

MARION OWENS, OF BASIL, KANSAS.

DUST-PROOF JOURNAL-BOX.

SPECIFICATION forming part of Letters Patent No. 692,334, dated February 4, 1902.

Application filed July 9, 1901. Serial No. 67,654. (No model.)

*To all whom it may concern:*

Be it known that I, MARION OWENS, a citizen of the United States, residing at Basil, in the county of Kingman and State of Kansas, have invented a new and useful Dust-Proof Journal-Box, of which the following is a specification.

The invention relates to improvements in dust-proof journal-boxes.

The object of the present invention is to improve the construction of journal-boxes for harrows and cultivators and to provide a simple and comparatively inexpensive one which will be strong and durable and adapted to reduce the friction to a minimum and capable of effectually excluding dust and of preventing the escape of oil.

The invention consists in the construction and novel combination and arrangement of parts hereinafter fully described, illustrated in the accompanying drawings, and pointed out in the claims hereto appended.

In the drawings, Figure 1 is a longitudinal sectional view of a ball-bearing constructed in accordance with this invention. Fig. 2 is a transverse sectional view on the line 2 2 of Fig. 1, the upper section being in position.

Like numerals of reference designate corresponding parts in both figures of the drawings.

1 and 2 designate upper and lower approximately semicylindrical journal-box sections receiving a horizontal or approximately horizontal spindle 3 of a disk 4, which is mounted on the outer end of the spindle, as clearly indicated in Fig. 1 of the accompanying drawings, by means of a nut 5. The outer end of the spindle is threaded for the reception of the nut, and a washer 6 is designed to be interposed between the nut and the disk. The outer portion 7 of the spindle is squared for the reception of the disk; but it may be made of any other polygonal shape.

The inner end of the sectional journal-box is closed and the bearing-opening is enlarged at the inner end to provide a recess or socket for the reception of a circular head 8 of the inner end of the spindle. Each of the journal-box sections is provided at the inner end of the bearing-opening with a semicircular recess 9, and these recesses register and form the socket for the head 8, which strengthens the spindle and equalizes the strain on the same. The inner end of the journal-box by being closed effectually excludes the dust at that point, and the sections are connected at opposite sides of the spindle 3 by bolts 10 or other suitable fastening devices.

The outer portion of the journal-box is provided with an annular groove or recess formed by approximately semicircular grooves 11 of the journal-box sections, and this annular groove receives an annular flange or collar 12, having a ball-race 13 and receiving an annular series of antifriction-balls 14, which are interposed between the collar 12 and the journal-box and located at the inner side of the former. The journal-box is provided at the outer wall of the annular groove 11 with an exterior annular flange 15, offset from the inner edge 16 of the said outer wall 17, to provide an annular recess for the reception of a small outer collar 18, arranged on the squared portion of the spindle 3. The outer collar, which may be constructed of any suitable material, is retained in place by a metal cap 19, and it fits within the said recess formed by the flange 15 and effectually excludes dust from the bearing and prevents the escape of oil. The upper section 1 is designed to be provided with a suitable oil hole or passage, and there is no liability of the oil escaping if it does not rise in the journal-box above the bottom section. The cap 19, which may be constructed of any suitable material, is provided with a rectangular opening to receive the squared portion of the spindle and it is mounted on the same.

It will be seen that the journal-box is exceedingly simple and inexpensive in construction, that it is adapted to provide a ball-bearing for the spindle 3 of the disk 4 to reduce the friction to a minimum, and that it is adapted to exclude dust at each end. It will also be apparent that the dust-proof journal-box is adapted to prevent the escape of oil and that there is no liability of the same leaking if it does not rise above the lower section of the journal-box.

What I claim is—

1. In a device of the class described, the combination of the sectional journal-box having a closed inner end and provided at its outer end with an annular groove and having an exterior annular flange extending from the outer wall of the groove and offset from the inner edge of the said wall to provide an annular recess, a spindle arranged in the journal-box and provided with an inner collar arranged in the annular groove and having a ball-race, antifriction-balls arranged in the ball-race, an outer collar mounted on the spindle and arranged in the recess formed by the exterior flange, and a cap mounted on the spindle and extending inward over the outer end of the journal-box, substantially as described.

2. In a device of the class described, the combination of a sectional journal-box closed at its inner end and provided at its outer end with an annular groove and having an exterior annular flange extending from the outer wall of the groove and forming an annular recess, a spindle provided with an inner collar arranged in the groove, said spindle being also provided with an outer collar arranged in the annular recess formed by the exterior flange, and a cap mounted on the spindle and receiving the outer end of the journal-box, substantially as described.

In testimony that I claim the foregoing as my own I have hereto affixed my signature in the presence of two witnesses.

MARION OWENS.

Witnesses:
WM. S. GROSVENOR,
W. W. DONALDSON.